US007076443B1

(12) United States Patent
Emens et al.

(10) Patent No.: US 7,076,443 B1
(45) Date of Patent: Jul. 11, 2006

(54) SYSTEM AND TECHNIQUE FOR AUTOMATICALLY ASSOCIATING RELATED ADVERTISEMENTS TO INDIVIDUAL SEARCH RESULTS ITEMS OF A SEARCH RESULT SET

(75) Inventors: Michael L Emens, San Jose, CA (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1116 days.

(21) Appl. No.: 09/583,516

(22) Filed: May 31, 2000

(51) Int. Cl.
*G06F 17/60* (2006.01)
(52) U.S. Cl. ............................. 705/14; 705/10; 705/26; 705/27
(58) Field of Classification Search .................. 705/1, 705/10, 14, 26, 27
See application file for complete search history.

(56) References Cited

U.S. PATENT DOCUMENTS

| 5,638,433 | A | * | 6/1997 | Bubien, Jr. et al. | ......... | 379/130 |
| 6,098,065 | A | * | 8/2000 | Skillen et al. | .................. | 707/3 |
| 6,119,101 | A | * | 9/2000 | Peckover | ..................... | 705/26 |
| 6,212,545 | B1 | * | 4/2001 | Ohtani et al. | ............... | 709/202 |
| 6,249,863 | B1 | * | 6/2001 | Redford et al. | ................ | 713/1 |
| 6,269,361 | B1 | * | 7/2001 | Davis et al. | .................... | 707/3 |
| 6,392,668 | B1 | * | 5/2002 | Murray | ....................... | 345/738 |
| 6,401,075 | B1 | * | 6/2002 | Mason et al. | ................. | 705/14 |

FOREIGN PATENT DOCUMENTS

WO    WO 98/36366    *    8/1998

OTHER PUBLICATIONS

Dialog reference. File 16, 06806736. "Excite@Home Launches New Shopping Service for Holiday Shoppers" PR Newswire, pp4463, Nov. 15, 1999.*

* cited by examiner

*Primary Examiner*—Raquel Alvarez
(74) *Attorney, Agent, or Firm*—Delio & Peterson; Leonard T. Guzman

(57) ABSTRACT

The resultant search result items from a search engine performing an Internet search are associated with similar or related advertisements. These associated advertisements, once acquired, may be viewed by a user on demand. An Internet user selects a query to submit to a search engine. For each search result item available from the query, a matching search of related product advertisements is then performed. For each related product advertisement found for a given search result item, the search result item is then flagged. This process is repeated until each search result item has been investigated and matched to related product advertisements when applicable. The user then designates a selection. This selection initiates a search of an advertisement database. Each product advertisement acquired is then formatted and displayed to the user.

The computer system capable of associating related advertisements to individual search results items uses the following subsystems: 1) a product database; 2) a user/session manager; 3) a product matching manager; 4) a product listing manager; and, 5) a result presentation manager.

35 Claims, 3 Drawing Sheets

SYSTEM AND TECHNIQUE FOR AUTOMATICALLY ASSOCIATING RELATED ADVERTISEMENTS TO INDIVIDUAL SEARCH RESULTS ITEMS OF A SEARCH RESULT SET

BACKGROUND OF THE INVENTION

1. Field of the Invention

This invention relates to the field of Internet Search Engine Technology, specifically, the arena of e-commerce solutions. More Specifically, this invention relates to e-commerce solutions that include target advertising.

2. Description of Related Art

With the accelerated growth of the Internet and its associated e-commerce activities, advertising over the Internet has become increasingly more acceptable to Internet users. Typically, this advertising is accomplished using so-called "banner ads", which are placed on popular web sites. Web sites having a high page view rate may reach millions of viewers in a relatively short amount of time.

However, relying on banner ads has inherent drawbacks. First, advertisements are made available to the users whether or not these ads have been specifically solicited. Second, banner ads rely on user profiling, which is burdensome to employ. Third, web site owners who are not technically savvy, or without available resources, can not easily acquire user profiling information.

Marketing people are continuously trying to focus and target specific banner ads to a specific audience. Preferably, this specific audience would include those Internet users who would most likely be interested in, and make use of, the advertised product. The current e-commerce approach to Internet advertising has been to display pre-selected advertisements for a general audience or for a target audience based on user profiling. Prior art methods have concentrated on assimilating information from user profiles collected from each Internet user. These user profiles are used to determine the appropriate advertisement banner(s) to display. For example, user profiles may contain the information that a particular user is interested in automobiles, particularly in purchasing an automobile. When this Internet user visits various web sites, the user's profile information may be retrieved and advertisement banner ads about automobiles or related products may be instantly displayed.

This approach provides several challenges. First, the user profiles need to be collected and built, which has proven to be cumbersome work. Second, the information in these user profiles will inevitably change when the interests of a user changes. In the aforementioned example, a user may be no longer interested in buying an automobile simply because he or she has just purchased one. Thus, it is important, yet extremely difficult to ensure these profiles remain current. Moreover, it is also difficult to identify a specific user, i.e., a user interested in purchasing automobiles, and associate the correct advertisement profile to the user. Many efforts within Internet search engine technology are being undertaken to enhance the selection of targeted advertisements based on user profiles, however, the challenges and limitations of such approaches indicate a need for a different method of ascertaining user information, and associating the appropriate corresponding advertisements to certain users.

The instant invention provides a new method and apparatus for associating search result items with similar or related advertisements. It is anticipated that the implementation of this methodology will establish a new avenue for generating revenue from Internet advertisements. Importantly, unlike the current user profiling methods, all web site owners who provide search engine services will be able make use of the instant invention, independent of whether user profiling information can be obtained.

Bearing in mind the problems and deficiencies of the prior art, it is therefore an object of the present invention to provide a method and apparatus for assimilating and displaying Internet advertisements during an Internet search that can be displayed to the user on demand.

It is another object of the present invention to provide a method and apparatus for assimilating and displaying Internet advertisements that do not rely on user profiling during an Internet search to individual users.

A further object of the invention is to provide a more accurate distribution of advertisements to a selected target audience or user during an Internet search for each user request.

Still other advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for targeting advertising based upon an information repository search by a user, comprising associating an advertisement with a result from the information repository search. This method further comprises providing the advertisement on demand by the user. The information repository may be associated with a server. The associating step of this method further comprises: analyzing the search result to produce at least one keyword; using the keyword to search for the associated advertisement within the repository; identifying the associated advertisement from the repository having a word that matches the keyword as related to the search result; and, correlating the associated advertisement with the search result.

In a second aspect, the instant invention is directed to a method for targeting related advertisements to individual search result items from a search of an information repository, comprising: matching the individual search result items to the related advertisements; and, designating those of the individual search result items matched to the related advertisements for subsequent selection by a user. The method of this second aspect further comprises first submitting a query to the information repository and obtaining the individual search result items. The designation of the individual search result items further comprises displaying a graphical user interface to the user.

Additionally, this method may store the related advertisements using a URL as an identifier for each of the individual search result items.

In a third aspect, the instant invention is directed to a method for providing related advertisements for search result items from a search of an information repository, comprising: matching the search result items to the related advertisements; designating each of the search result items that have the related advertisements matched therewith; providing a corresponding graphical user interface for each of the search result items so designated for subsequent user selection; searching and retrieving the related advertisements for one of the search result items when the corresponding graphical user interface is selected by a user; and, formatting and displaying the related advertisements upon selection.

In a fourth aspect, the instant invention is directed to a program storage device readable by a machine, tangibly embodying a program of instructions executable by the machine to perform the method steps for targeting advertising based upon an information repository search by a user, comprising associating an advertisement with a search result from the information repository search. This device further comprises performing the step of providing the advertisement on demand by the user.

The associating step of this program storage device further comprises: analyzing the search result to produce at least one keyword; using the keyword to search for the associated advertisement within the repository; identifying the associated advertisement from the repository having a word that matches the keyword as related to the search result; and, correlating the associated advertisement with the search result. Additionally, the device displays along with the search result, a user-selectable icon containing a link to the associated advertisement.

In a fifth aspect, the instant invention is directed to a program storage device readable by a machine, tangibly embodying a program of instructions executable by the machine to perform the method steps for targeting related advertisements to individual search result items from a search of an information repository, the method steps comprising: matching the individual search result items to the related advertisements; and, designating those of the individual search result items matched to the related advertisements for subsequent selection by a user.

In a sixth aspect, the instant invention is directed to program storage device readable by a machine, tangibly embodying a program of instructions executable by the machine to perform the method steps for providing related advertisements for search result items from a search of an information repository, comprising: matching the search result items to the related advertisements; designating each of the search result items that have the related advertisements matched therewith; providing a corresponding graphical user interface for each of the search result items so designated for subsequent user selection; searching and retrieving the related advertisements for one of the search result items when the corresponding graphical user interface is selected by a user; and, formatting and displaying the related advertisements upon selection.

In a seventh aspect, the instant invention is directed to a system for providing related advertisements for search result items from a search of an information repository, comprising: a user/session manager adapted to maintain and track user sessions, user queries, and advertisement requests; a product database adapted to provide storage and retrieval for the related advertisements; a product matching manager adapted to analyze the search result items and match the related advertisements corresponding to each of the search result items; a request server adapted to display results from the search and to display the related advertisements from the product matching manager; and, a product presentation manager adapted to reference and retrieve the related advertisements that correspond to each of the search result items, in the product database, and to formulate the related advertisements into a list, and pass the list to the request server.

In an eighth aspect, the instant invention is directed to a computer program product for providing related advertisements for search result items from a search of an information repository, comprising: a computer readable program code for causing a computer to effect maintaining and tracking user sessions, user queries, and advertisement requests; a computer readable program code for causing a computer to effect providing storage and retrieval of the related advertisements; a computer readable program code for causing a computer to effect analyzing the search result items and matching the related advertisements corresponding to each of the search result items; a computer readable program code for causing a computer to effect displaying results from the search and displaying the related advertisements; and, a computer readable program code for causing a computer to effect referencing and retrieving the related advertisements corresponding to each of the search result items, formulating the related advertisements into a list, and presenting the list to a user.

In a ninth aspect, the instant invention is directed to a computer program product for selecting related advertisements for search result items from a search of an information repository, comprising a computer readable program code for: causing a computer to effect matching the search result items to the related advertisements; a computer readable program code for causing a computer to effect designating each of the search result items that have the related advertisements matched therewith; a computer readable program code for causing a computer to effect providing a corresponding graphical user interface for each of the search result items so designated for subsequent selection by a user; a computer readable program code for causing a computer to effect searching and retrieving the related advertisements for one of the search result items when the corresponding graphical user interface is selected by the user; and, a computer readable program code for causing a computer to effect formatting and displaying the related advertisements upon selection.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

The method of the instant invention follows an approach uniquely different from the e-commerce method of user profiling. Instead of using user profiles to target advertisement, the resultant search result items from a search engine performing an Internet search are utilized. These search result items are associated with similar or related advertisements. Importantly, once these associated advertisements are acquired, they may be viewed by the user on demand. For example, if a software developer is searching for a specific piece of software code, a query will be entered to initiate a search on an Internet search engine, e.g., yahoo.com or .ibm.com/java. The search engine then returns a specific search result set showing items which may contain the sought after information. For each search result item, a graphical user interface (GUI) selection is presented, allowing the user to select the GUI, on demand if so desired, to investigate related advertisements. Selecting the GUI will initiate a search in the search engine's advertisement database using the associated search result item as the basis for this second search. In the instant example, the second search would be based on the search result item of a related piece of software code. Selecting the GUI will invoke the advertisement search and return a set of banner ads, in this case showing advertisements for software developers.

The invention's philosophy relies on the principle that users who are performing a search query have a special interest in finding a particular piece of information. From this one may deduce that if a user is interested in a specific piece of information, he or she may be interested in related or similar advertisements. Consequently, unlike the prior art methods of selecting and displaying banner ads predicated on user profiles, these profiles need not be relied upon. Instead the initial search results themselves are utilized. These search results provide a more narrowly defined basis for selecting target advertisements for each user.

Figure 1:
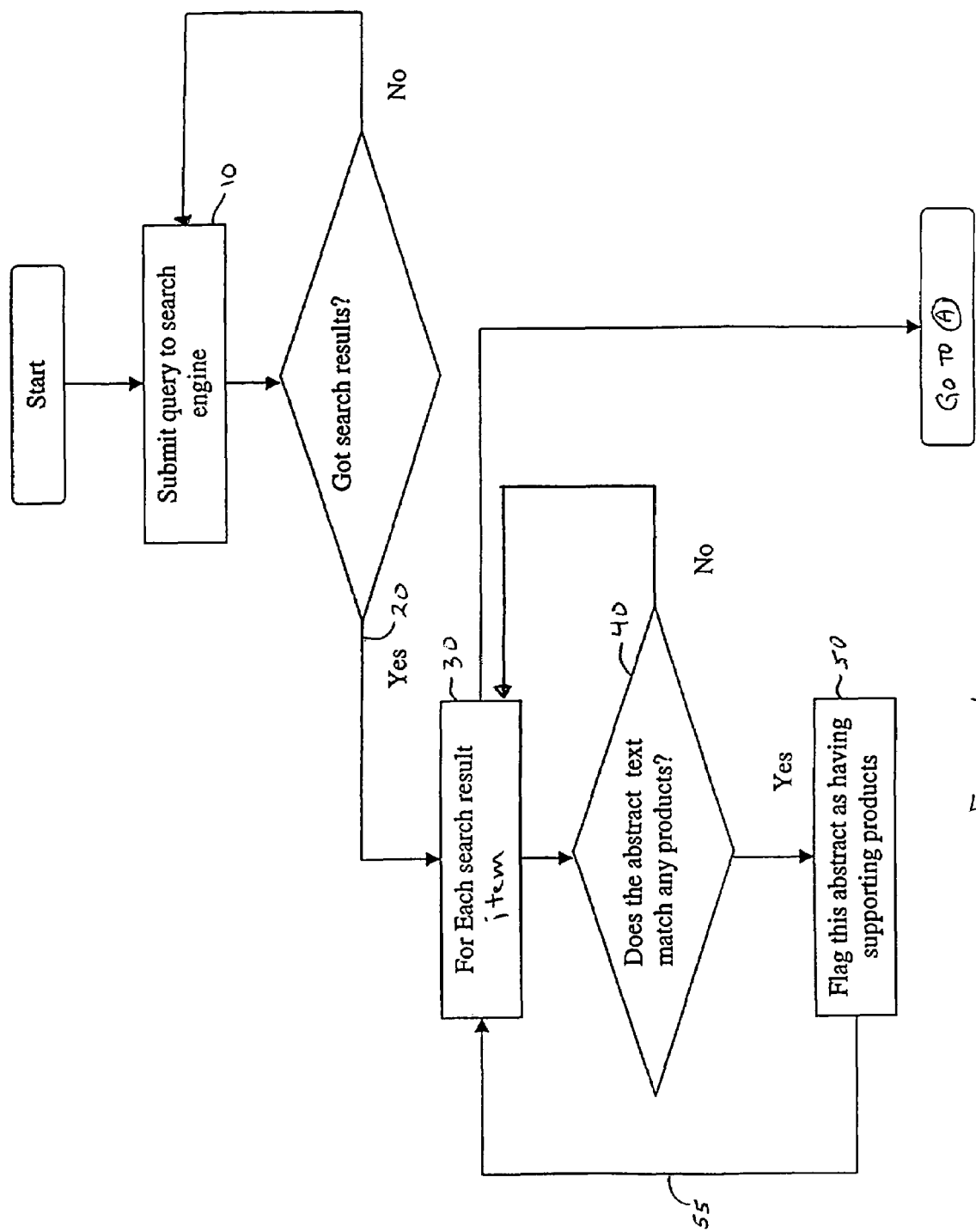
FIG. 1 is a flowchart representing the methodology for matching search result items to corresponding Internet advertised products.
Figure 2:
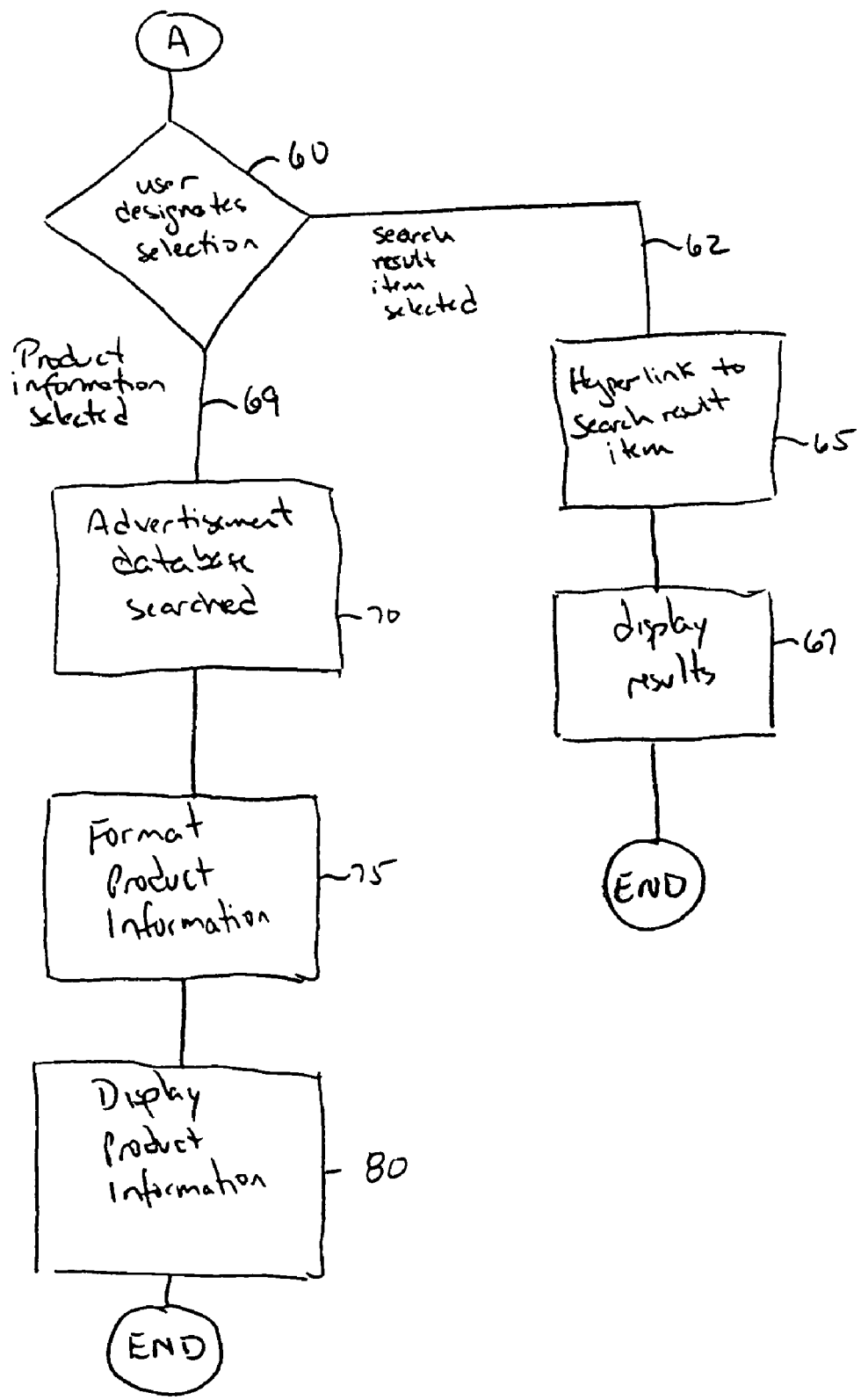
FIG. 2 is a flowchart for displaying and searching on the matched items of FIG. 1.

FIGS. 1 and 2 are flowcharts illustrating the preferred method for automatically associating related advertisements to individual search result items from a search result set. The search is to an information repository generally, and more specifically, to a server or wide area network. FIG. 1 represents the methodology flow for matching search result items, such as abstracts, and the like, to corresponding advertised products in an information repository. First, an information repository user selects a query 10 to submit to a search engine. For an Internet search, this search engine may be one of many existing types, such as yahoo.com, ibm.com/java, and the like. If search result items are available from this query 20, then for each search result item 30, the method requires a match search 40 of related products. If related products are found for a given search result item in the match search 40, the search result item or abstract is then flagged 50, generally by utilizing a graphical user interface selection designator. The next search result item is then investigated 55 for related products. This process is repeated until each search result item has been investigated and matched to related product advertisements when applicable.

FIG. 2 represents the program flow for displaying the flagged search result items, and searching for and retrieving related advertisements. First, the user designates a selection 60. This can be either one of two designations: a) the search result item may be selected for further investigation 62; or, b) a graphical user interface or product icon may be selected to acquire information on related advertised products 69. If the search result item is searched 62, the user's selection of the search result item's hyperlink will lead the user to the desired item's information 65. The search result item's information will then be displayed 67. If, however, the user desires related product information associated with each search result item having been flagged with corresponding related product advertisements, the user selects 69 one of the graphical user interfaces (flags) or product icons. This selection initiates a search 70 of an advertisement database. Each product advertisement acquired and assimilated with the designated search result item, is then formatted 75 and displayed 80 to the user. This gives the user the opportunity to review, at her sole discretion, related product advertisements for specifically selected search result items.

Figure 3:
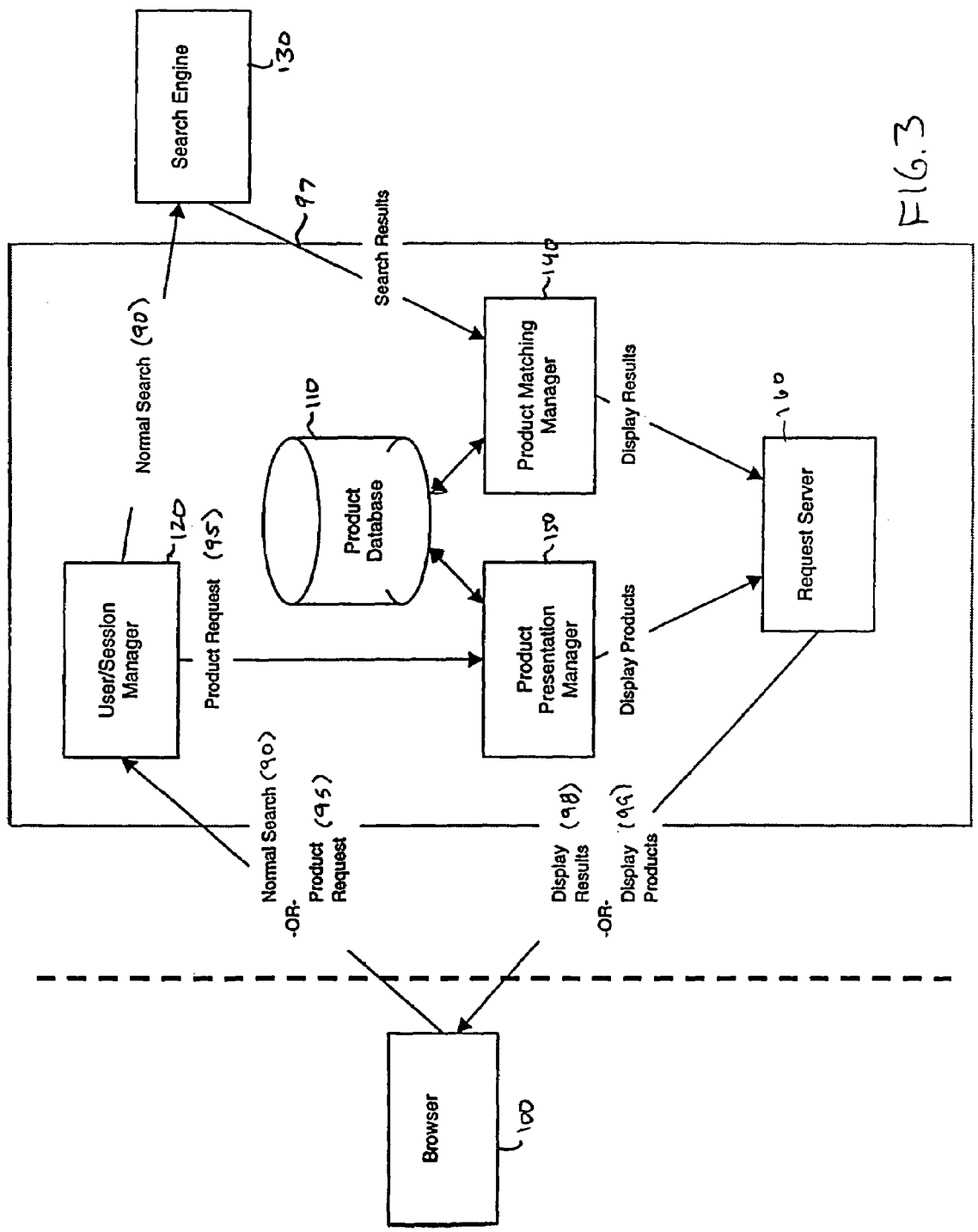
FIG. 3 is a diagram of the system architecture illustrating the various subsystems of the invention.

To achieve the described functionality above, the architecture of the system comprises the following subsystems: 1) a product database; 2) a user/session manager; 3) a product matching manager; 4) a product listing manager; and, 5) a result presentation manager. FIG. 3 is a diagram of the system architecture illustrating these various subsystems of the invention.

Depending upon which search is being performed, i.e., a general user query or a subsequent search of product advertisements based on the search result items from the general query, these subsystems will take on multiple functions. Thus, the preferred function of each subsystem is divided depending upon the types of searches or passes performed.

Query, Product Matching, and Results Presentation Pass

Referring to FIG. 3, the product database 110 provides storage for a list of potential product advertisements. The type of information pertaining to these products may be in the form of images, such as hyperlinks or full HTML pages, and the like. It is not necessary to dictate the details of this database, provided accessible images can be acquired. The primary purpose of product database 110 is provide a repository for potentially matching product advertisements for the search results.

The user/session manager subsystem 120 is responsible for maintaining and tracking user sessions, user queries, and product advertisement requests. Each user performing a query is assigned a user session identifier. This session identifier is used to associate user queries to search result items selections, i.e., product selections. When a user initially submits a query, a normal Internet search 90 is performed. The query is forwarded to the user/session manager subsystem 120 which then forwards it on to search engine 130. The search engine 130 performs an Internet search and produces a search results set. The search results set is then forwarded 97 to the product matching manager 140.

The product matching manager 140 takes the search engine results set and attempts to match at least one product to each of the search result items. This is accomplished, in part, through communication with the product database 110. For example, if the search had yielded twenty five (25) in the results set, the product matching manager 140 would, for each of those twenty five search result items, try to match at least one of the products found in the product database 110 to the individual search result item. Additionally, a storage and retrieval component, or caching component, may be used to expedite the matching process. The caching component may be part of the product matching manager 140, or a separate subsystem. This additional caching component stores frequent advertising queries, using the URL of the search result item as a unique key identifier. For each match found, the product matching manager 140 then flags the corresponding search result item. This flag is used by the request server 160, also referred to as the results presentation manager, to display a graphical user interface designator, which may simply be a product icon. Since performance of the implementation is time sensitive, the complete product list is not associated with each search result item at this time. The caching component may be adapted to yield a TRUE or FALSE designation to the user depending on whether related advertisements exist for the URL of a particular search result item. Every result for an advertisement is stored in the caching component. Advertising queries issued from the product matching manager 140 perform a first inquiry in the caching component database, and then a full advertising query if no information is found in the caching component database for the particular search result item.

Alternatively, the product matching manager 140 may be adapted to perform an off-line batch process for each search result item in the search engine repository. The product database 110 and the search engine repository are synchronized for this alternative approach. For example, for any new product advertisements, the product matching manager 140 would update the cache.

If a search result item can be associated with at least one related product, then this search result item is flagged. This ensures that when looking for related products, a user can not select a flag which could then lead to an empty product list.

The request server 160 then builds a results page which contains the search result items, and if the search result item was flagged as a having a product match, a product icon or graphical user interface designator is also displayed for subsequent user selection. The search result items and associated product icons are then displayed 98 to the browser 100.

Product Selection and Product Presentation Pass

The request server 160 displays the results that the user will receive from the query, product matching, and results presentation pass. The user may either select from the search result set as before, or select a product icon corresponding to each search result item having at least one product advertisement associated with it in the search result set. If the user selects a search result item (not the product icon), he or she is ultimately shown the information pertaining to that item. However, if the user requests a product 95 by selecting the product icon, the user/session manager 120 routes the product request 95 to the product presentation or product listing manager 150.

The product presentation manager 150 then references the products in the Product Database 110. Products which match this search result item are then formulated into one list and passed to the request server or results presentation manager 160.

The result presentation manager 160 builds a results page which now contains the initial single search result item along with a list of products from which the user may select on demand. This results page is sent 99 to the browser 100 to display the selected search result item with its corresponding products. The format of this results page can be anything from a text based match list or a full graphical, and which includes HTML and/or graphics which illustrate this product along with corresponding hyperlinks to each of the third party products.

Thus, the implementation of the instant invention provides several significant advantages over the prior art techniques. First, advertisements are selected independent of user profiling techniques. Second, these advertisements can now be provided on the user's demand. Third, the instant invention facilitates a better distribution of advertisements to a more narrowly focused group of users, those user who have a more direct interest in the advertised products.

The present invention is described herein in the context of an Internet application merely as a specific example, and is not meant to limit its applicability to Internet technology. Those skilled in the art will understand that the invention is broadly applicable to any method in which it is desirable to associate an advertisement with a result from an information repository search.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
The invention claimed is:

1. A method of targeting at least one associated advertisement from an Internet search having access to an information repository by a user, comprising:
   identifying at least one search result item from a search result of said Internet search by said user;
   searching for said at least one associated advertisement within said repository using said at least one search result item;
   identifying said at least one associated advertisement from said repository having at least one word that matches said at least one search result item; and
   correlating said at least one associated advertisement with said at least one search result item.

2. The method of claim 1 further comprising providing said at least one associated advertisement on demand by said user.

3. The method of claim 1 wherein said information repository is associated with an Internet server.

4. The method of claim 1 further comprising displaying along with said at least one search result item a user-selectable icon containing a link to said at least one associated advertisement.

5. The method of claim 1 further comprising:
   designating said at least one search result item matched to said at least one associated advertisement for subsequent selection by a user.

6. The method of claim 5 further comprising first submitting a query to said information repository and obtaining said at least one search result item.

7. The method of claim 5 wherein designating said at least one search result item further comprises displaying a graphical user interface to said user.

8. The method of claim 7 wherein said graphical user interface comprises a product icon.

9. The method of claim 5 wherein said at least one associated advertisement comprises at least one related product advertisement.

10. The method of claim 5 further comprising assigning a user identifier prior to matching said at least one search result item to said at least one associated advertisement.

11. The method of claim 5 further comprising formatting said at least one associated advertisement matched with said at least one search result item so designated, prior to displaying said at least one related product advertisement.

12. The method of claim 5 further comprising storing said at least one associated advertisement using a URL as an identifier for each of said at least one search result item.

13. The method of claim 5 further comprising performing an off-line batch process for each of said at least one search result item, wherein said batch process identifies said at least one associated advertisement for said at least one search result item.

14. The method of claim 5 further comprising providing a true/false designator to a user, wherein said designator indicates whether said at least one associated advertisement exists for said at least one search result item.

15. A method for providing related advertisements for search result items from a search of an information repository, comprising:
   matching said search result items to said related advertisements;
   designating each of said search result items that have said related advertisements matched therewith;

providing a corresponding graphical user interface for each of said search result items so designated for subsequent user selection;

searching and retrieving said related advertisements for one of said search result items when said corresponding graphical user interface is selected by a user; and, formatting and displaying said related advertisements upon selection.

16. The method of claim 15 further comprising assigning an identifier for said user when said user submits a query to said information repository.

17. The method of claim 15 wherein said related advertisements comprise related product advertisements.

18. The method of claim 15 wherein said graphical user interface comprises a product icon.

19. The method of claim 15 further comprising storing said related advertisements using a URL as an identifier for each of said search result items.

20. The method of claim 15 further comprising performing an off-line batch process for each of said search result items, wherein said batch process identifies said related advertisements for said search result items.

21. A program storage device readable by a machine, tangibly embodying a program of instructions executable by the machine to perform the method steps for targeting at least one associated advertisement from an Internet search having access to an information repository by a user, comprising:

identifying at least one search result item from a search result of said Internet search by said user;

searching for said at least one associated advertisement within said repository using said at least one search result item;

identifying said at least one associated advertisement from said repository having at least one a word that matches said at least one search result item; and correlating said at least one associated advertisement with said at least one search result item.

22. The program storage device of claim 21 further comprising providing said at least one associated advertisement on demand by said user.

23. The program storage device of claim 21 further comprising displaying along with said at least one search result a user-selectable icon containing a link to said at least one associated advertisement.

24. A program storage device readable by a machine, tangibly embodying a program of instructions executable by the machine to perform the method steps for targeting related advertisements to individual search result items from a search of an information repository, said method steps comprising:

matching said individual search result items to said related advertisements; and, designating those of said individual search result items matched to said related advertisements for subsequent selection by a user.

25. The program storage device of claim 24 further comprising the method step of first submitting a query to said information repository and obtaining said individual search result items.

26. The program storage device of claim 24 wherein designating said individual search result items further comprises displaying a graphical user interface to said user.

27. The program storage device of claim 24 further comprising the method step of storing said related advertisements using a URL as an identifier for each of said individual search result items.

28. The program storage device of claim 24 further comprising the method step of performing an off-line batch process for each of said individual search result items, wherein said batch process identifies said related advertisements for said search result items.

29. A program storage device readable by a machine, tangibly embodying a program of instructions executable by the machine to perform the method steps for providing related advertisements for search result items from a search of an information repository, comprising:

matching said search result items to said related advertisements;

designating each of said search result items that have said related advertisements matched therewith;

providing a corresponding graphical user interface for each of said search result items so designated for subsequent user selection;

searching and retrieving said related advertisements for one of said search result items when said corresponding graphical user interface is selected by a user; and, formatting and displaying said related advertisements upon selection.

30. A system for providing associated advertisements for search result items from an Internet search of an information repository, comprising:

a user/session manager means for maintaining and tracking search result items from user sessions, user queries, and advertisement requests;

a product database means for providing storage and retrieval for said associated advertisements;

a product matching manager means for analyzing said user sessions, said user queries, and said advertisement requests from said user/session manager and matching said associated advertisements from said product database corresponding to each of said search result items;

a request server means for displaying results from said search and displaying said associated advertisements from said product matching manager; and, a product presentation manager means for referencing and retrieving said associated advertisements that correspond to each of said search result items, in said product database, and to formulate said associated advertisements into a list, and pass said list to said request server.

31. The system of claim 30 further comprising a search engine and a browser.

32. A computer program product comprising a computer usable medium having computer usable program code for providing related advertisements for search result items from a search of an information repository, the computer program product comprising:

a computer readable program code means for causing a computer to effect maintaining and tracking user sessions, user queries, and advertisement requests;

a computer readable program code means for causing a computer to effect providing storage and retrieval of said related advertisements;

a computer readable program code means for causing a computer to effect analyzing said search result items and matching said related advertisements corresponding to each of said search result items;

a computer readable program code means for causing a computer to effect displaying results from said search and displaying said related advertisements; and, a computer readable program code means for causing a computer to effect referencing and retrieving said related advertisements corresponding to each of said search result items, formulating said related advertisements into a list, and presenting said list to a user.

33. A computer program product comprising a computer usable medium having computer usable program code for selecting related advertisements for search result items from a search of an information repository, the computer program product comprising:
   a computer readable program code means for causing a computer to effect matching said search result items to said related advertisements;
   a computer readable program code means for causing a computer to effect designating each of said search result items that have said related advertisements matched therewith;
   a computer readable program code means for causing a computer to effect providing a corresponding graphical user interface for each of said search result items so designated for subsequent selection by a user;
   a computer readable program code means for causing a computer to effect searching and retrieving said related advertisements for one of said search result items when said corresponding graphical user interface is selected by said user; and,
   a computer readable program code means for causing a computer to effect formatting and displaying said related advertisements upon selection.

34. The computer program product of claim 33 further comprising
   a computer readable program code means for causing a computer to effect submitting a query to said information repository; and,
   a computer readable program code means for causing a computer to effect obtaining said search result items from said information repository.

35. The computer program product of claim 34 further comprising a computer readable program code means for causing a computer to effect assigning an identifier for said user when said query is submitted to said information repository.

* * * * *